United States Patent [19]
McLaren et al.

[11] Patent Number: 5,390,608
[45] Date of Patent: Feb. 21, 1995

[54] BRIEFCASE ADAPTOR

[76] Inventors: Randy L. McLaren, 236-11th Street N.E., Canada; Douglas J. Biers, 424-30 Avenue NE, both of Calgary, Alberta, Canada

[21] Appl. No.: 81,793

[22] Filed: Jun. 23, 1993

[51] Int. Cl.6 ............................................. A47B 23/00
[52] U.S. Cl. ........................................ 108/44; 108/25
[58] Field of Search ............................. 108/25, 44, 45; 224/275, 277

[56] References Cited

U.S. PATENT DOCUMENTS

| | | |
|---|---|---|
| 3,338,629 | 8/1967 | Drees . |
| 3,873,010 | 3/1975 | Patterson . |
| 3,909,092 | 9/1975 | Kiernan . |
| 3,917,275 | 11/1975 | Alpher .............................. 108/25 X |
| 3,922,973 | 12/1975 | Sturgeon ........................... 108/44 X |
| 3,949,917 | 4/1976 | Mann . |
| 4,146,159 | 3/1979 | Hemmen . |
| 4,787,541 | 11/1988 | Pollard ............................. 108/44 X |
| 4,832,241 | 5/1989 | Radcliffe . |
| 4,846,382 | 7/1989 | Foultner et al. .................. 108/44 X |
| 4,872,723 | 10/1989 | Kopf . |
| 4,928,865 | 5/1990 | Lorence et al. ................... 108/44 X |
| 4,940,003 | 7/1990 | Mayhew et al. ...................... 108/44 |
| 4,942,827 | 7/1990 | Norgaard . |
| 4,946,120 | 8/1990 | Hatcher . |
| 4,972,781 | 11/1990 | Montgomery et al. ............... 108/25 |
| 5,085,153 | 2/1992 | McKee ................................. 108/44 |
| 5,092,507 | 3/1992 | Szablak et al. . |

FOREIGN PATENT DOCUMENTS 2187089 9/1987 United Kingdom .

*Primary Examiner*—Jose V. Chen
*Attorney, Agent, or Firm*—Jerry Kearns

[57] ABSTRACT

A briefcase adaptor includes a planar top surface supporting nested inner and outer trays. The inner tray is removable and includes hook and loop type pile fasteners for releasable engagement with cooperating fasteners secured to the top surface of a conventional briefcase. A raised spaced floor of the adaptor includes two compartments for holding miscellaneous items such as a clipboard, books, documents, etc. A beverage holding console extends along one side edge of the adaptor and includes a top surface provided with a plurality of apertures for storage of beverage containers and miscellaneous items such as a cordless phone. Beverage receptacle apertures include slotted portions for positioning a handle on a mug type beverage container. A pyramidal positioning block extending along an opposite lateral side of the adaptor is dimensioned to be received in a central recessed portion of an automobile seat back portion adjacent a junction with the automobile seat bottom portion. A central recessed zone beneath the raised floor of the adaptor supports the adaptor in level orientation on an automobile seat bottom portion, and allows the adaptor to be used as a bed or lap table or tray.

16 Claims, 2 Drawing Sheets

BRIEFCASE ADAPTOR

BACKGROUND OF THE INVENTION

1. Field of the Invention

The present invention relates to portable desks and trays, and particularly pertains to portable desks and trays of the type especially adapted for use in automobiles.

2. Description of the Prior Art

A wide variety of portable desks and trays of the type especially adapted for use in the interior of motor vehicles have been heretofore proposed. Such devices typically include straps, buckles, or flanges adapted for engagement with seat belt or seat portions of the vehicle to maintain the device in place on a vehicle seat. Accordingly, prior to removing the devices from the vehicle, it is typically necessary to unfasten or otherwise release the desk or tray from engagement with a portion of the vehicle. This is a somewhat time consuming operation which makes use of the prior art devices somewhat tedious. Additionally, the various types of prior art portable desks and trays adapted for use in automobiles do not provide for the simultaneous support of a conventional briefcase in a manner that allows access to the interior contents thereof. Finally, the prior art devices intended principally only for use in the interior of a vehicle and not readily or conveniently adaptable for use in other environments.

SUMMARY OF THE INVENTION

Accordingly, it is an object of the present invention to provide a new and improved briefcase adaptor which includes a planar top surface supporting nested inner and outer trays. The inner tray is removable and includes hook and loop type pile fasteners for releasable engagement with cooperating fasteners secured to the top surface of a conventional briefcase. A raised spaced floor of the adaptor includes two compartments for holding miscellaneous items such as a clipboard, books, documents, etc. A beverage holding console extends along one side edge of the adaptor and includes a top surface provided with a plurality of apertures for storage of beverage containers and miscellaneous items such as a cordless phone. Beverage receptacle apertures include slotted portions for positioning a handle on a mug type beverage container. A pyramidal positioning block extending along an opposite lateral side of the adaptor is dimensioned to be received in a central recessed portion of an automobile seat back portion adjacent a junction with the automobile seat bottom portion. A central recessed zone beneath the raised floor of the adaptor supports the adaptor in a level orientation on an automobile seat bottom portion, and allows the adaptor to be used as a bed or lap table or tray.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

DETAILED DESCRIPTION OF THE PREFERRED EMBODIMENT(S)

Figure 1:
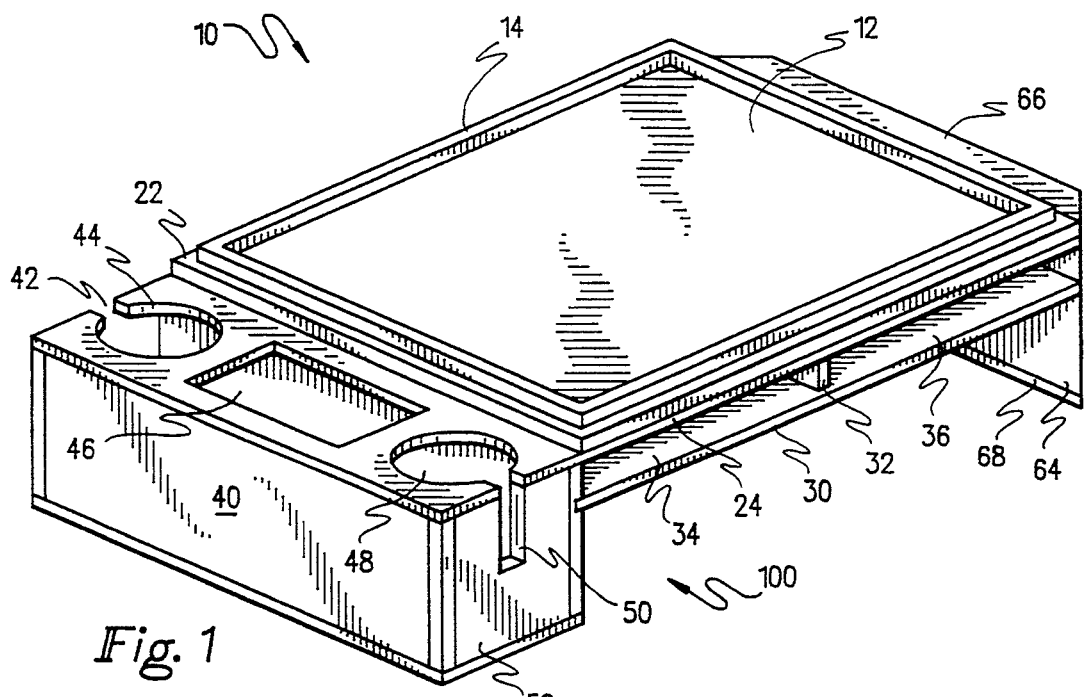
FIG. 1 is a top front perspective view of the briefcase adaptor according to the present invention.
Figure 2:
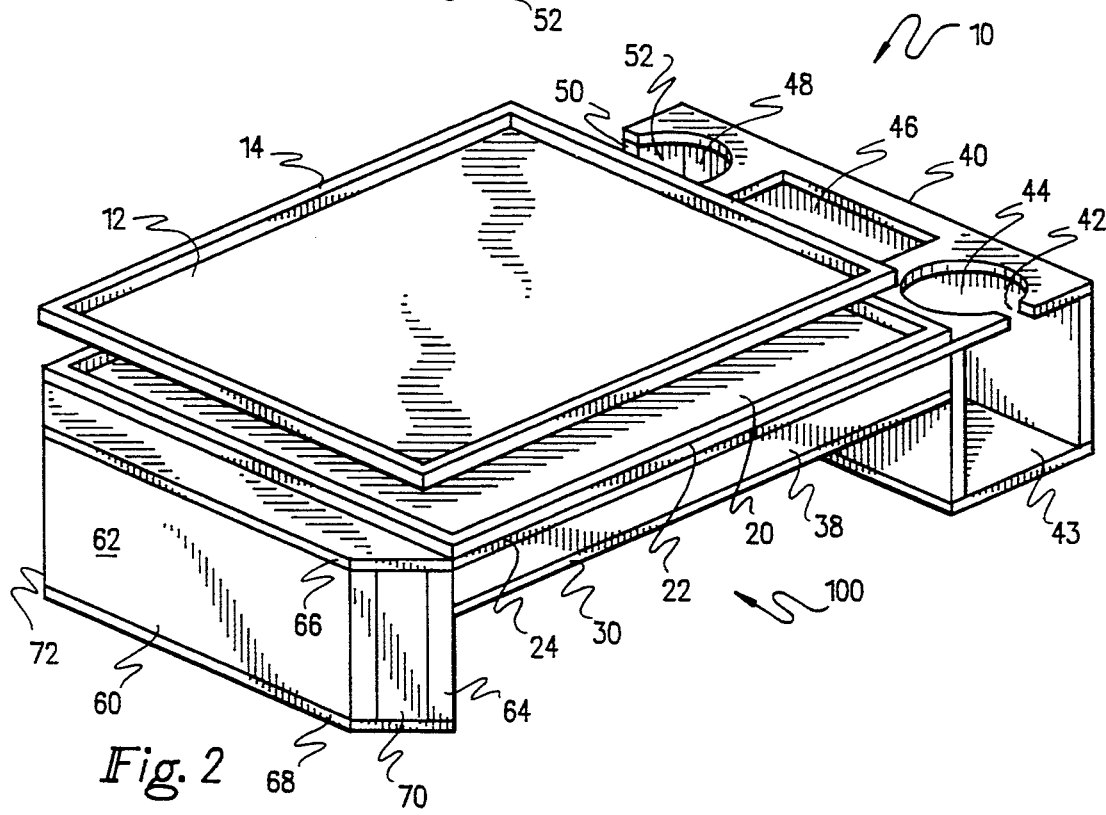
FIG. 2 is a top rear perspective view of the briefcase adaptor according to the present invention.
Figure 3:
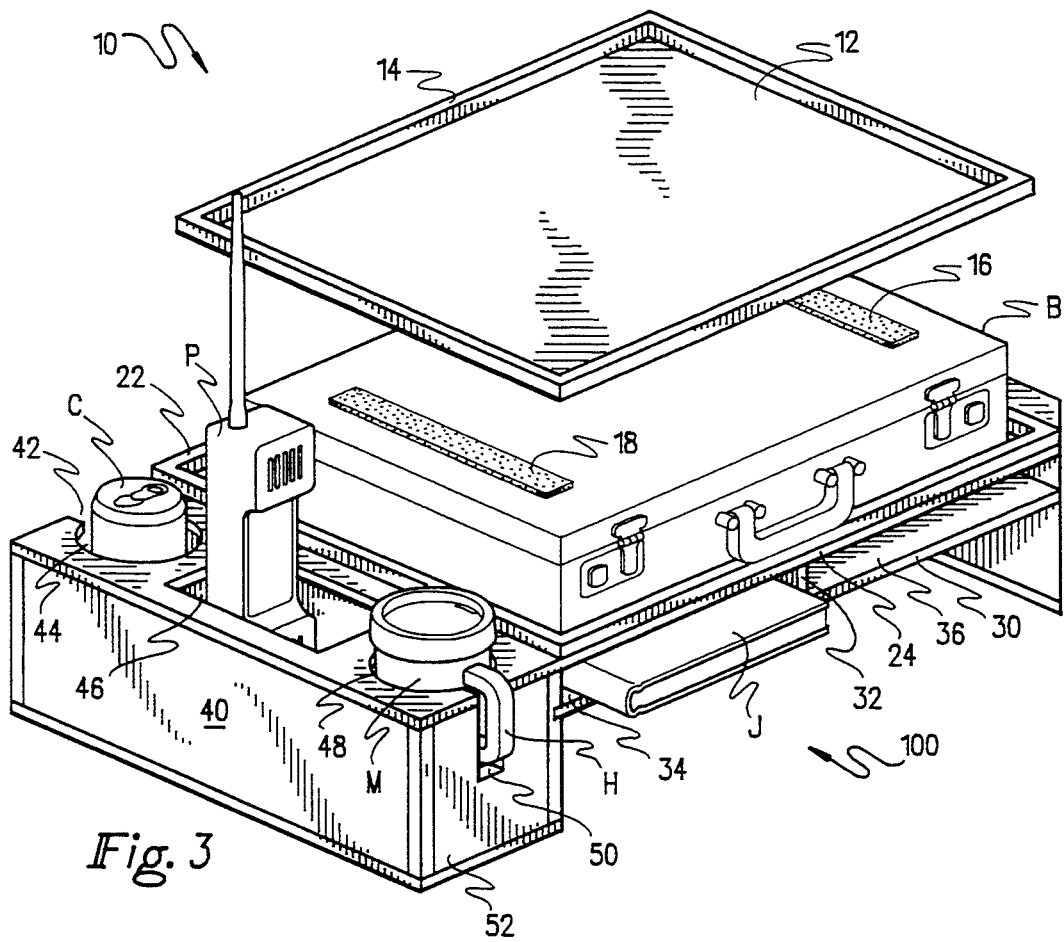
FIG. 3 is a top front perspective view of the briefcase adaptor of the present invention, illustrating the manner of securing the inner tray to the top surface of the hinged lid of a conventional briefcase.

Referring now to the drawings, wherein like reference numerals designate corresponding structure throughout the views, and referring in particular to FIGS. 1 through 4, an improved briefcase adaptor 10 according to a first preferred embodiment of the invention includes an inner tray 12 possessing a smooth substantially planar tray surface surrounded by a rectangular upstanding ledge 14. As shown in FIG. 3, the bottom surface of the tray 12 may be provided with hook and loop type pile fastening strips of the type sold under the trademark VELCRO ® for engagement with complementary fastening strips 16 and 18 adhesively or otherwise secured in spaced parallel relation on the outer top surface of the hinged lid of a conventional briefcase B. Accordingly, the briefcase B may be disposed within the confines of a fixed outer tray 20 bounded by an upstanding rectangular rim 22. Thus, it should be appreciated that the briefcase B is sandwiched between inner tray 12 and outer tray 20. In the context of this description, the term "outer" is used in the sense of laterally outer to describe the nesting relation of the trays 12 and 20.

The outer tray 22 is preferably permanently fixed, for example by adhesives or otherwise, to a top partition wall 24 of the briefcase adaptor 10 which extends in spaced parallel relation to a raised planar floor 30 for the purpose, in conjunction with centrally disposed upstanding divider 32, of defining compartments 34 and 36 for storing miscellaneous items such as a clipboard, books (such as the journal J shown in FIG. 3), documents, etc. A back panel wall 38 prevents such items from inadvertently falling out of the back ends of compartments 34 and 36.

A beverage holding console 40 is substantially permanently secured along a first lateral edge of the briefcase adaptor 10 and includes a top surface provided with a plurality of apertures 44, 46, and 48 communicating with the hollow interior portion thereof. A first beverage can receiving circular aperture 44 includes a laterally outwardly opening rectangular slot 42 for the purpose of receiving and retaining a handle of a mug-type beverage container. A second, similar circular aperture 48 includes a notch or slot 50 formed in an end wall 52 for a similar purpose. As shown in FIG. 3, the handle H of a mug M may be conveniently received within slot 50 for maintaining the handle in an easily accessible orientation and preventing spillage of the contents of the mug M. A conventional soda or other beverage can C is conveniently received within the receptacle 44. A central rectangular receptacle 46 is adapted to receive and support various miscellaneous items such as a cordless phone P, calculator, etc.

Figure 4:
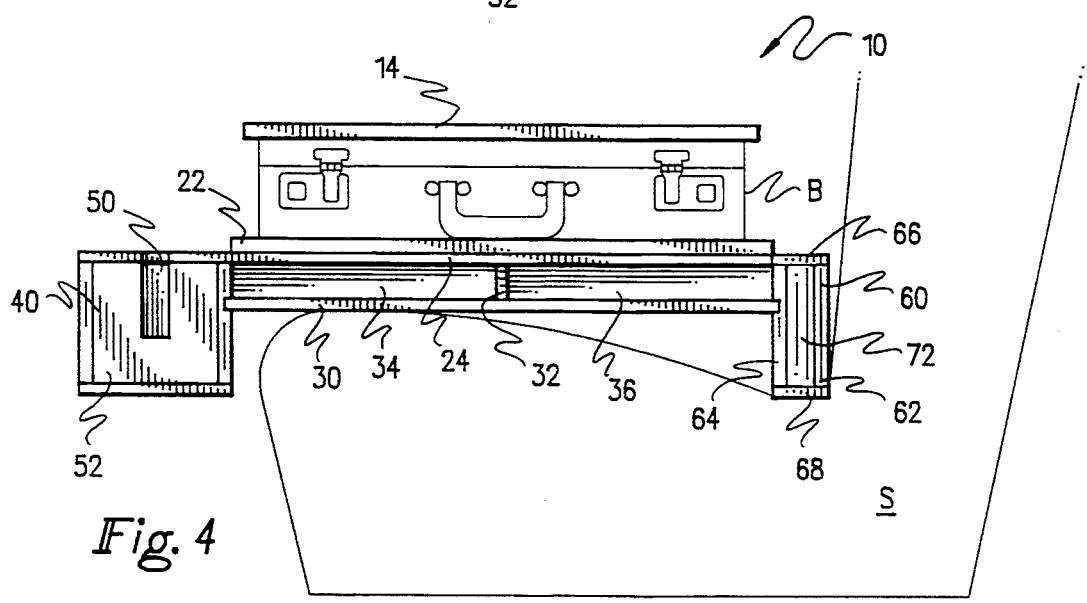
FIG. 4 is a front elevational view illustrating the briefcase adaptor of the present invention disposed in an operative position on an automobile seat and including a conventional briefcase supported thereon.

A pyramidal positioning block 60 extends along the lateral side edge of the briefcase adaptor 10 opposite that to which the beverage holding console 40 is secured. The positioning block 60 includes rectangular, spaced, parallel, side faces 62 and 64 connected by opposite rectangular end faces 70 and 72, as well as trapezoidal top 66 and bottom 68 faces. The positioning block 60 is dimensioned to be received in the central recessed portion of an automobile seat back S, as shown in FIG. 4. Conventional automobile seat backs S typically include a central generally vertically extending seat back portion flanked by somewhat raised or protruding vertically extending side supports intended to prevent an individual's torso from swaying laterally when negotiating corners, particularly at relatively high speeds. The positioning block 60 of the present invention includes obliquely angled end faces 70 and 72 adapted for guiding the positioning blocks 60 into the central recessed seat back region. As shown in FIG. 4, the conventional vehicle seat bottom portion typically inclines upwardly in a forwards direction toward the front of the vehicle. To compensate for this typical inclined vehicle seat bottom portion construction the floor portion 30 of the adaptor 10 is raised vertically above the bottom face 68 of the positioning block 60 such that both the bottom face 68 and floor 30 are in firm engagement with the vehicle seat. To provide additional support against inadvertent displacement of the adaptor 10, the positioning block 60 may be weighted by filling with sand, lead, or other relatively heavy material.

It is also contemplated that the briefcase adaptor 10 may be utilized in a wide variety of other non-automotive environments. For example, the central recessed portion 100 allows the adaptor 10 to be used as a bed or lap tray or table, with the legs of a reclining or sitting individual extending through the recess 100. In this context, it should be noted that the bottom surface of beverage holding console 40 and positioning block 60 are substantially coplanar to ensure level orientation. In an optional feature of the present invention, small adjustable legs may be provided on bottom surfaces of the adaptor 10. Such legs may be telescopically extensible and securable in adjusted position by a spring biased ball detent or otherwise. Alternatively, pivotal retracting legs may also be employed.

As may now be readily appreciated, the briefcase adaptor 10 is usable with or without a conventional briefcase B, thus serving as a portable desk. When used with the briefcase B in place, the hinged lid of the briefcase may be readily opened while the inner tray 12 remains secured in position thereon.

The briefcase adaptor 10 may be formed from a wide variety of different materials, such as plastic, metal, wood, pressed fiberboard and hardboard materials such as the type available under the trademark MASONITE, and the like.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable desk, comprising:
    a substantially planar top surface;
    an outer tray including an upstanding peripheral rim supported on said top surface;
    an inner tray including an upstanding peripheral ledge, said inner tray removably received in nested relation within said outer tray; and
    at least one cooperating fastener means for releasably securing said inner tray to an outer surface of a hinged lid of a conventional briefcase.

2. The portable desk of claim 1, further comprising a floor connected to said portable desk and extending in spaced parallel relation with said top surface defining at least one compartment for the receipt of miscellaneous items.

3. The portable desk of claim 1, further comprising a beverage holding console secured along one side of said portable desk.

4. The portable desk of claim 3, wherein said beverage holding console includes at least one circular aperture dimensioned to receive a mug-type beverage container and possessing a slot portion for receiving and retaining a handle of a mug-type beverage container.

5. The portable desk of claim 3, further comprising a positioning block secured along a side of said portable desk opposite said beverage holding console, said positioning block possessing a pyramidal configuration dimensioned for receipt in a central recessed portion of a conventional automobile seat back.

6. The portable desk of claim 5, wherein bottom surfaces of said beverage holding console and said positioning block are disposed in substantially coplanar relation and define a central recessed zone for receiving legs of a reclining or sitting individual therethrough such that said portable desk may be utilized as a bed tray or lap desk.

7. The portable desk of claim 1, further comprising a positioning block secured along one side of said portable desk, said positioning block possessing a pyramidal configuration dimensioned for receipt in a central recessed portion of a conventional automobile seat back.

8. The portable desk of claim 7, wherein said positioning block is weighted.

9. A portable desk, comprising:
    a substantially planar top surface;
    an outer tray including an upstanding peripheral rim supported on said top surface;
    an inner tray including an upstanding peripheral ledge, said inner tray removably received in nested relation within said outer tray;
    a beverage holding console secured along one side of said portable desk;
    a positioning block secured along a side of said portable desk opposite said beverage holding console, said positioning block possessing a pyramidal configuration dimensioned for receipt in a central recessed portion of a conventional automobile seat back; and
    bottom surfaces of said beverage holding console and said positioning block disposed in substantially coplanar relation and defining a central recessed zone for receiving legs of a reclining or sitting individual therethrough such that said portable desk may be utilized as a bed tray or lap desk.

10. The portable desk of claim 9, further comprising a floor connected to said portable desk and extending in spaced parallel relation with said top surface defining at least one compartment for the receipt of miscellaneous items.

11. The portable desk of claim 9, wherein said positioning block is weighted.

12. A portable desk, comprising:
a substantially planar top surface;
an outer tray including an upstanding peripheral rim;
an inner tray including an upstanding peripheral ledge, said inner tray removably received in nested relation within said outer tray;
a floor connected to said desk and extending in spaced parallel relation with said top surface defining at least one compartment for the receipt of miscellaneous items;
a beverage holding console secured along one side of said portable desk, said beverage holding console including at least one circular aperture dimensioned to receive a mug-type beverage container and possessing a slot portion for receiving and retaining a handle of mug-type beverage container;
a positioning block secured along an opposite side of said portable desk from said beverage holding console, said positioning block possessing a pyramidal configuration dimensioned for receipt in a central recessed portion of a conventional automobile seat back; and
bottom surfaces of said beverage holding console and said positioning block disposed in substantially coplanar relation and spaced beneath said floor defining a central recessed zone for optionally receiving legs of a sitting or reclining individual therethrough whereby said portable desk may be used as a bed tray or lap desk.

13. The portable desk of claim 12, further comprising at least one cooperating fastener means for releasably securing said inner tray to an outer surface of a hinged lid of a conventional briefcase.

14. The portable desk of claim 12, wherein said positioning block is weighted.

15. A briefcase adaptor, comprising:
a substantially planar top surface;
an outer tray including an upstanding peripheral rim;
an inner tray including an upstanding peripheral ledge, said inner tray removably received in nested relation within said outer tray;
at least one cooperating fastener means for releasably securing said inner tray to an outer surface of a hinged lid of a conventional briefcase;
a floor connected to said desk and extending in spaced parallel relation with said top surface defining at least one compartment for the receipt of miscellaneous items;
a beverage holding console secured along one side of said briefcase adaptor, said beverage holding console including at least one circular aperture dimensioned to receive a mug-type beverage container and possessing a slot portion for receiving and retaining a handle of mug-type beverage container;
a positioning block secured along an opposite side of said briefcase adaptor from said beverage holding console, said positioning block possessing a pyramidal configuration dimensioned for receipt in a central recessed portion of a conventional automobile seat back; and
bottom surfaces of said beverage holding console and said positioning block disposed in substantially coplanar relation and spaced beneath said floor defining a central recessed zone for optionally receiving legs of a sitting or reclining individual therethrough whereby said briefcase adaptor may be used as a bed tray or lap desk.

16. The portable desk of claim 15, wherein said positioning block is weighted.

* * * * *